United States Patent
Won et al.

(10) Patent No.: US 9,088,171 B2
(45) Date of Patent: Jul. 21, 2015

(54) METHOD FOR WIRELESS CHARGING USING COMMUNICATION NETWORK

(75) Inventors: Eun-Tae Won, Seoul (KR); Jae-Seung Son, Gyeonggi-do (KR); Joon-Ho Park, Gyeonggi-do (KR); Jun-Ho Koh, Gyeonggi-do (KR); Hee-Won Jung, Gyeonggi-do (KR); Seung-Hoon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 703 days.

(21) Appl. No.: 13/047,372

(22) Filed: Mar. 14, 2011

(65) Prior Publication Data

US 2011/0221391 A1 Sep. 15, 2011

(30) Foreign Application Priority Data

Mar. 12, 2010 (KR) .......................... 10-2010-0022519
Jul. 12, 2010 (KR) .......................... 10-2010-0067025

(51) Int. Cl.
| | | |
|---|---|---|
| H02J 7/00 | (2006.01) | |
| H01M 10/44 | (2006.01) | |
| H01M 10/46 | (2006.01) | |
| H02J 7/02 | (2006.01) | |

(52) U.S. Cl.
CPC ............. *H02J 7/0054* (2013.01); *H01M 10/44* (2013.01); *H01M 10/46* (2013.01); *H02J 7/025* (2013.01)

(58) Field of Classification Search
USPC ................. 320/108, 107, 110, 114, 125, 183; 307/104
See application file for complete search history.

(56) References Cited

U.S. PATENT DOCUMENTS

| | | | |
|---|---|---|---|
| 2002/0089305 A1* | 7/2002 | Park et al. ...................... | 320/108 |
| 2005/0170827 A1* | 8/2005 | Nagashima .................... | 455/419 |
| 2006/0113955 A1* | 6/2006 | Nunally ........................ | 320/108 |
| 2007/0036154 A1* | 2/2007 | Lipman ......................... | 370/356 |
| 2007/0096691 A1 | 5/2007 | Duncan et al. | |
| 2008/0211455 A1* | 9/2008 | Park et al. ...................... | 320/108 |
| 2008/0215429 A1* | 9/2008 | Ramer et al. ................... | 705/14 |
| 2009/0243541 A1 | 10/2009 | Jeong et al. | |
| 2011/0087907 A1 | 4/2011 | Jantunen et al. | |
| 2012/0112692 A1 | 5/2012 | Arai | |

FOREIGN PATENT DOCUMENTS

| | | |
|---|---|---|
| JP | 2003-070187 | 3/2003 |
| JP | 2003-262525 | 9/2003 |
| JP | 2004-222457 | 8/2004 |
| JP | 2005-012973 | 1/2005 |
| JP | 2008-154446 | 7/2008 |
| JP | 2009-245359 | 10/2009 |
| JP | 2011-521580 | 7/2011 |
| WO | WO 2009/156553 | 12/2009 |

* cited by examiner

*Primary Examiner* — Yalkew Fantu
(74) *Attorney, Agent, or Firm* — The Farrell Law Firm, P.C.

(57) ABSTRACT

A method for wireless charging of an electronic apparatus includes: requesting a server for information regarding chargeable electronic devices; receiving the information regarding chargeable electronic devices from the server; and performing charging with at least one electronic device.

23 Claims, 12 Drawing Sheets

METHOD FOR WIRELESS CHARGING USING COMMUNICATION NETWORK

PRIORITY

This application claims priority under 35 U.S.C. §119(a) to applications filed in the Korean Intellectual Property Office on Mar. 12, 2010 and Jul. 12, 2010 and assigned Serial Nos. 10-2010-0022519 and 10-2010-0067025, respectively, the entire contents of both of which are incorporated herein by reference.

BACKGROUND OF THE INVENTION

1. Field of the Invention

The present invention relates generally to a charging apparatus and method, and in particular, to a method for wireless charging using a communication network.

2. Description of the Related Art

A mobile terminal, such as a cellular phone or a Personal Digital Assistant (PDA), is powered by a rechargeable battery according to characteristics of the mobile terminal, and in order to charge the battery, electrical energy is supplied by a separate charger. Separate contact terminals are commonly equipped in a charger and a battery, and these respective contact terminals are placed into contact with each other, thereby connecting the charger and the battery to each other in order to charge the battery.

However, since such contact terminals protrude outwards, the contact terminals are easily contaminated due to foreign substances, thereby preventing the battery from being correctly charged. In addition, when the contact terminals are exposed to humidity, charging may not be performed correctly.

To solve these problems, wireless and contactless charging technologies have been recently developed and utilized to a number of electronic devices.

The wireless charging technology uses a wireless power transmission and reception system, for example, a system for automatically charging a battery only if a cellular phone is put on a charging pad without connecting the cellular phone to a separate charging connector. Such wireless charging technology is applied in wireless electric toothbrushes and wireless electric shavers, for example. Since the wireless charging technology can increase the effectiveness of a waterproof feature by charging an electronic product in a wireless manner and does not need a wired charger, the portability of the electronic product can be increased.

The wireless charging technologies are largely classified into an electromagnetic induction method using a coil, a resonance method, and a Radio Frequency (RF)/microwave radiation method for converting electrical energy to a microwave and radiating the microwave.

Although the electromagnetic induction method is currently the most widely used method, there have been recent success in experiments for transmitting power in a wireless manner at a distance of tens meters by using a microwave.

The electromagnetic induction method for transmitting power delivers power between a primary coil and a secondary coil. An induction current is generated when a magnet moves through a coil. A transmission end generates a magnetic field using the induction current, and a reception end generates energy by acting as a magnet. This phenomenon is referred to as a magnetic induction phenomenon, and a power transmission method using the magnetic induction phenomenon provides excellent energy transfer efficiency.

The electromagnetic induction method is a most practically used method and is applied to various devices. The conventional wireless charging or contactless charging technologies mostly uses the electromagnetic induction method, which is applied to products, such as electric shavers and toothbrushes, using a nickel battery.

For the resonance method, professor Soljacic at the Massachusetts Institute of Technology (MIT) announced in 2005 a system for wirelessly transferring electricity several meters from a charger using a coupled mode theory as the resonance type power transmission principle. This resonance method is based upon the concept that when a tuning fork is rung, a nearby wine glass also vibrates with the same number of vibrations as the tuning fork. The MIT team used resonance of an electromagnetic wave containing electrical energy instead of resonance of the sound. Unlike other electronic waves, since the electrical energy is directly transferred to a device having a resonance frequency only if the device exists nearby and an unused portion is reabsorbed into an electromagnetic field without being spread to the air, the electromagnetic wave according to the resonance method will not affect a nearby machine or human body.

The RF/microwave radiation method is a new concept of power transmission method for converting power energy to a microwave advantageous to wireless transmission to transfer the power energy. According to this method, electrical energy is transferred instead of a signal used in a wireless communication method for a radio or wireless phone. While general communication relates to a method of carrying a signal on a carrier, wireless power transmission relates to a method of transferring only a carrier itself.

Although the conventional wireless charging technology is generally limited to devices such as electric shavers and electric toothbrushes, recently, the resonance method has been developed and many researches has been proceeding to introduce the wireless charging technology to cellular phones and televisions. Accordingly, a method for helping power charging between devices capable of power transmission and reception has been being researched.

SUMMARY OF THE INVENTION

An object of the present invention is to substantially solve at least the above problems and/or disadvantages and to provide at least the advantages below. Accordingly, an object of the present invention is to provide a method and apparatus for performing wireless charging between a terminal and a charger using a communication network.

According to one aspect of the present invention, a method for wireless charging of an electronic apparatus is provided. The method includes sending, to a server, a request for information regarding chargeable electronic devices; receiving, from the server, the information regarding chargeable electronic devices; and charging the electronic apparatus with power supplied by at least one electronic device according to the received information.

According to another aspect of the present invention, a method for managing wireless charging of an electronic apparatus in a server is provided. The method includes receiving, from a terminal, a request of information regarding chargeable electronic devices; checking the information regarding chargeable electronic devices; and transmitting, to the terminal, the checked information regarding chargeable electronic devices.

According to a further aspect of the present invention, a method performed in an electronic device for managing a supply of power for wireless charging to a terminal is provided. The method includes receiving a request for state information of the electronic device; determining the state information; transmitting the determined state information; receiving, from the terminal, a request for supplying power for wireless charging to the terminal; and supplying power for wireless charging to the terminal according to the received request.

According to still another aspect of the present invention, a portable terminal is provided. The portable terminal includes a wireless charging processor for receiving information regarding chargeable electronic devices through communication with a server, confirming the received information, and controlling wireless charging with power supplied by at least one selected chargeable electronic device according to the received information; and a wireless power receiver for receiving wireless power supplied from the at least one selected chargeable electronic device and providing the received power to a battery of the portable terminal.

According to a still further aspect of the present invention, a server apparatus is provided. The server apparatus includes a wireless charging processor for determining information regarding chargeable electronic devices and providing the determined information to a terminal; and a terminal/electronic device information management unit for managing information regarding the terminal and at least one electronic device for wirelessly supplying power to the terminal.

According to yet another aspect of the present invention, an electronic device is provided. The electronic device includes a state information confirming unit for checking state information of the electronic device and providing state information; a wireless charging processor for controlling communication with a terminal and a server and controlling a supply of charging power requested by the terminal; and a power converter for converting power supplied by a power source unit into wireless power to be wirelessly supplied to the terminal.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF EMBODIMENTS OF THE PRESENT INVENTION

Embodiments of the present invention are described herein below with reference to the accompanying drawings. In the following description, descriptions of known functions and configurations incorporated herein have been omitted for clarity and conciseness. In the following description, although many specific items, such as components of a concrete circuit, are shown, the specific items are providing a general understanding of the present invention, and it will be understood by those of ordinary skill in the art that the present invention can be implemented without these specific items.

Figure 1:
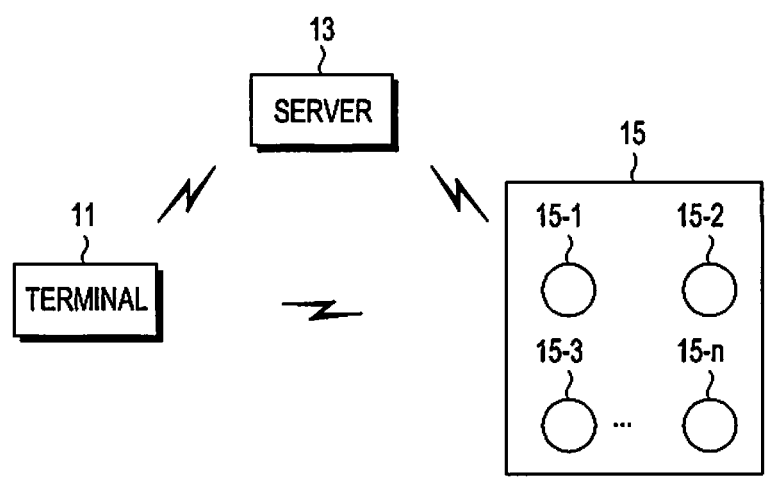
FIG. 1 is a schematic block diagram illustrating a wireless power charging system according to an embodiment of the present invention.

FIG. 1 is a schematic block diagram illustrating a wireless power charging system according to an embodiment of the present invention. Referring to FIG. 1, the wireless power charging system includes a terminal 11 requiring charging, a server 13 for managing wireless charging of the terminal 11, and an electronic device 15 capable of wireless charging.

The terminal 11 is a portable terminal capable of communicating with the server 13 and further capable of being wirelessly charged with power supplied by the electronic device 15. The terminal 11 may be a device such as a mobile communication terminal or a Personal Digital Assistant (PDA), for example.

The server 13 receives, from the terminal 11 that is connected through a communication network, a request to provide information regarding wireless power-supplying devices, confirms the information regarding wireless power-supplying devices, and notifies the terminal 11 of the information regarding wireless power-supplying devices. To confirm the information regarding wireless power-supplying devices, the server 13 checks information previously stored in the server 13 or searches for electronic devices (such as the electronic device 15) that are capable of providing charging power to the terminal 11 through real-time communication. The server 13 generates a charger list containing the found electronic device 15 and generates information regarding chargeable electronic devices, which contains the charger list.

Furthermore, the server 13 may confirm state information of the electronic device 15 and generate a charger list with the state information. For example, the state information may include information indicating whether there is permission to receive power supplied by the electronic device 15, information indicating a type and a state of a power source, and position information of the electronic device 15. In addition, the server 13 may select a chargeable electronic device based on the state information of the electronic device and generate a charger list containing the selected chargeable electronic device, such as the chargeable electronic device 15, for example.

The server 13 may insert the charger list containing the found electronic device 15 into information regarding chargeable electronic devices, or may select the chargeable electronic device 15 and insert a charger list containing the selected electronic device 15 into the information regarding chargeable electronic devices. The server 13 may also confirm the state information and insert the state information into the charger list, or may generate a charger list containing only electronic devices without separate state information.

Accordingly, when the found electronic device 15 is contained in the information regarding chargeable electronic devices, the terminal 11 confirms an electronic device to charging the terminal 11. The confirmation of the electronic device to charge the terminal 11 can be achieved by user-selection of one of a plurality of electronic devices or a selection of an electronic device for performing charging without a user input by using information included in the information regarding chargeable electronic devices. Further, the information regarding chargeable electronic devices may contain state information, and may provide the state information to a user or consider the state information when an electronic device for performing charging is selected. Otherwise, if the information regarding chargeable electronic devices does not contain the state information, the terminal 11 may confirm the state information through communication with the electronic device 15.

If the information regarding chargeable electronic devices contains a charger list containing the selected electronic device, an electronic device for performing charging has been selected by the server 13, so the terminal 11 may be wirelessly charged by requesting charging power from the electronic device 15 contained in the charger list without confirming an electronic device for performing charging.

Meanwhile, the electronic device 15 can wirelessly transmit power wireless manner, and is connected to the server 13 and the terminal 11 through a communication network. The electronic device 15 may be a single charger, such as a common charger, or may be included in a portable terminal (e.g., a mobile communication terminal). In addition, the electronic device 15 may include a wireless charging station installed and operated by a power service company supplying commercial power.

The electronic device 15 receives a request of state information from the terminal 11 or the server 13, confirms the state information, and provides the state information to the terminal 11 or the server 13. The state information may include information indicating whether there is permission to receive power supplied by the electronic device 15.

The information indicating whether there is permission information including an indication of whether the electronic device 15 supplies wireless charging power to the terminal 11, and may be previously set and stored by a user of the electronic device 15. Alternatively, when the server 13 requests for the state information, a request for input indicating whether to supply wireless charging power may be provided to the user through a display of the electronic device 15, and the electronic device 15 may receive a result of the input and generate the information indicating whether there is permission to supply the power. Alternatively, the electronic device 15 may set a condition for power supply permissions in advance, determine permission based on the previously set condition, and insert a result of the determination into the information indicating whether there is permission to supply power to the terminal 11.

Since the electronic device 15 can be a charger or a portable terminal, the electronic device 15 can include any of various power sources. For example, if the electronic device 15 is a common charger or a wireless charging station, a power source of the electronic device 15 may be commercial power, otherwise, if the electronic device 15 is a portable terminal, a power source of the electronic device 15 may be a battery. Accordingly, types of the power source include commercial power and a battery. A state of the power source includes remaining power information of the battery.

Figure 2:
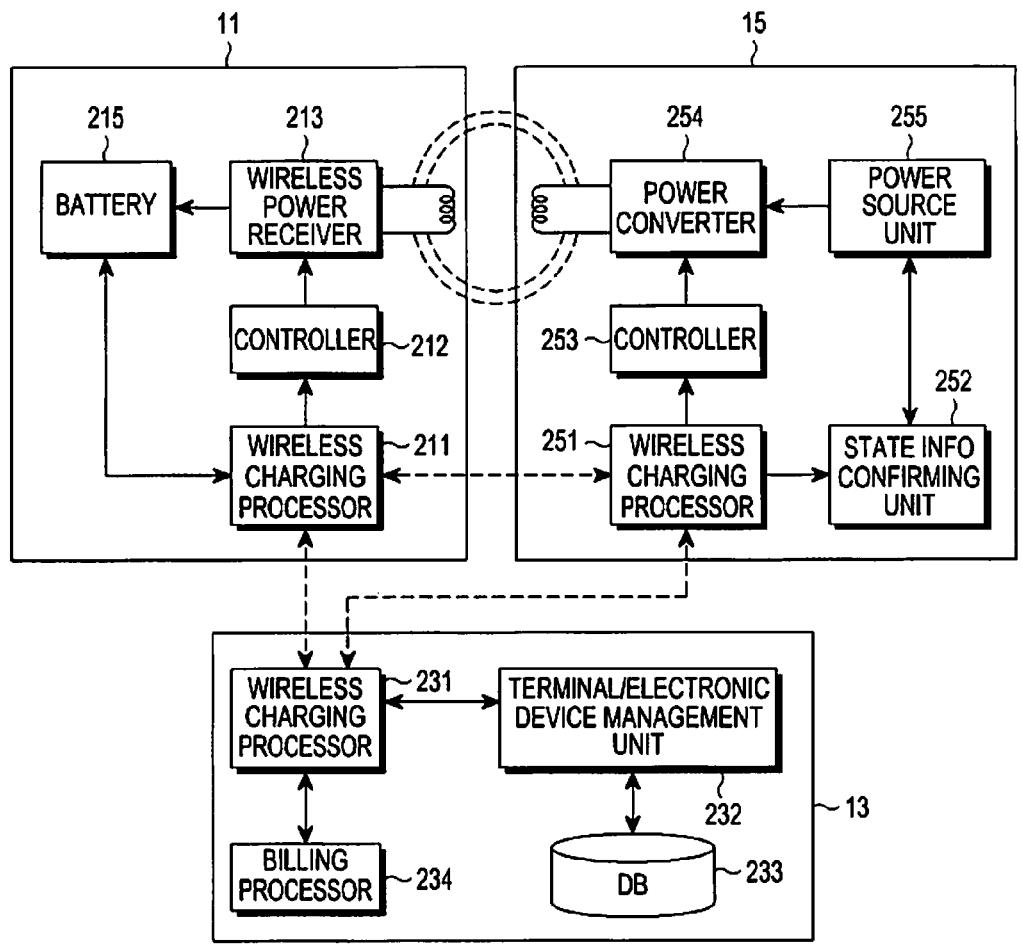
FIG. 2 is a detailed block diagram illustrating the wireless power charging system according to an embodiment of the present invention.

FIG. 2 is a detailed block diagram illustrating the wireless power charging system according to an embodiment of the present invention.

The terminal 11 includes a wireless charging processor 211 for confirming whether charging of a battery 215 has begun and for performing wireless charging through communication with the server 13 and the electronic device 15. The terminal 11 further includes a controller 212 for receiving, from the wireless charging processor 211, a request to control of a wireless power receiver 213 and for controlling the wireless power receiver 213. The terminal 11 further includes the wireless power receiver 213 for wirelessly receiving power from at least one electronic device 15 and supplying charging power to the battery 215.

The server 13 includes a wireless charging processor 231 for processing communications with the terminal 11 and the electronic device 15, confirming information regarding chargeable electronic devices, which is requested by the terminal 11, and providing the information regarding chargeable electronic devices to the terminal 11. The server 13 further includes a terminal/electronic device management unit 232 for managing information regarding the terminal 11 and the electronic device 15, a DataBase (DB) 233 for storing the information regarding the terminal 11 and the electronic device 15, and a billing processor 234 for processing billing for wireless charging.

The electronic device 15 includes a wireless charging processor 251 for performing communication related to wireless charging through connections to the terminal 11 and the server 13, and a state information confirming unit 252 for confirming state information requested by the terminal 11 or the server 13. The electronic device 15 further includes a controller 253 for receiving, from the wireless charging processor 251, a request to control a power converter 254 and for controlling the power converter 254. The electronic device 15 further includes a power source unit 255, and the power converter 254 for converting power received from the power source unit 255 and transmitting the converted power to the terminal 11. The power source unit 255 may be a Switch Mode Power Supply (SMPS) for converting a commercial power source to a Direct-Current (DC) power source or a battery for portable terminals.

Hereinafter, operations of the terminal 11, the server 13, and the electronic device 15 included in the wireless power charging system, concrete configurations of the terminal 11, the server 13, and the electronic device 15 are described in detail.

The wireless charging processor 211 receives a request for wireless charging. The request may be received from a user or receives and stores in advance an input of a charging setup (e.g., remaining power of a battery for which charging starts) for wireless charging from the user. Upon receiving the request, the wireless charging processor 211 checks remaining power of the battery 215, and if the remaining power of the battery 215 is relatively less than or equal to a power level corresponding to the charging setup, the wireless charging processor 211 determines to start charging of the battery 215.

Upon a determination to start charging the battery 215 starts, the wireless charging processor 211 sends a request, to the server 13, for information regarding chargeable electronic devices. In this case, the wireless charging processor 211 may check position information of the terminal 11 and transmit the position information together with the request.

In response to the request, the wireless charging processor 231 included in the server 13 checks the information regarding chargeable electronic devices.

The terminal/electronic device management unit 232 manages information regarding the terminal 11 and the electronic device 15 through the DB 233, and in particular, may store information indicating whether the electronic device 15 supports wireless charging in the DB 233. Thus, the wireless charging processor 231 may request the terminal/electronic device management unit 232 for at least one electronic device, such as electronic device 15, supporting wireless charging to check the information regarding chargeable electronic devices, and the terminal/electronic device management unit 232 may search the DB 233 for at least one electronic device and transmit a list of the found at least one electronic device to the wireless charging processor 231. Further, the terminal/electronic device management unit 232 may manage position information of the terminal 11 and the at least one electronic device. In this case, in response to a request from the wireless charging processor 231 for at least one electronic device, such as electronic device 15, supporting wireless charging, the terminal/electronic device management unit 232 may search the DB 233 for electronic devices existing in an area where the terminal 11 is located by considering the position information of the terminal 11 and the electronic devices, and transmit a list of electronic devices found as a result of the search to the wireless charging processor 231.

The wireless charging processor 231 may generate a charger list containing the found electronic devices, generate information regarding chargeable electronic devices, which contains the charger list, and provide the information regarding chargeable electronic devices to the terminal 11.

The terminal 11 receives the information regarding chargeable electronic devices through the wireless charging processor 211. The wireless charging processor 211 confirms the charger list contained in the information regarding chargeable electronic devices in order to confirm the found electronic devices 15. At least one of the found electronic devices is selected through the wireless charging processor 211. For example, the wireless charging processor 211 may provide the list of the found electronic devices to the user through a display so as for the user to select at least one of the found electronic devices or may automatically select an electronic device satisfying a condition set in advance by the user.

Further, in order to more easily select an electronic device, the wireless charging processor 211 sends a request for state information to the found electronic devices. In response to the request, the wireless charging processor 251 of each of the found electronic devices (e.g., electronic device 15) checks state information through the state information confirming unit 252 and transmits the state information to the terminal 11.

The state information may contain at least one of information indicating permission for the electronic device 15 to supply power, information indicating a type and a state of a power source of the electronic device 15, and position information of the electronic device 15. As a result, the selected electronic device 15 may be an electronic device having permission to supply power to another electronic device, an electronic device having a type and a state of a power source for stably supplying power, and/or an electronic device nearby the terminal 11.

The wireless charging processor 211 may use the state information to select a chargeable electronic device. That is, the wireless charging processor 211 may provide the state information to the user or select an electronic device having state information satisfying a predetermined condition.

The wireless charging processor 211 requests the selected electronic device 15 for power for wireless charging. In addition, the wireless charging processor 211 sends a request for wireless charging control to the controller 212. In response to the request, the controller 212 transmits, to the wireless power receiver 13, a control signal for starting an operation of the wireless power receiver 213, and the wireless power receiver 213 waits for wireless power reception.

The wireless charging processor 251 of the electronic device 15 receives, from the wireless charging processor 211 of the terminal 11, a request of power for charging and requests the controller 253 to commence wireless charging. In response to the request, the controller 253 generates a control signal for commanding operations of the power source unit 255 and the power converter 254, and transmits the control signal to the power source unit 255 and the power converter 254. The power converter 254 wirelessly transmits power supplied by the power source unit 255.

As a result, the wireless power receiver 213 of the terminal 11 supplies, to the battery 215, wireless power supplied by the selected electronic device 15.

Although, according to the above-described example, the server 13 generates and provides a charger list containing the found electronic devices 15 and the terminal 11 performs charging by selecting at least one of the electronic devices 15 contained in the charger list, the present invention is not limited thereto. Alternatively, the server 13 may select at least one of the found electronic devices, insert the selected at least one electronic device into the charger list, and transmit the charger list to the terminal 11.

More specifically, the wireless charging processor 231 may select at least one of the found electronic devices and generate a charger list containing the selected at least one electronic device. In order to more easily perform the selection of at least one electronic device, the wireless charging processor 231 may send, to the found electronic devices, a request for state information, receive the requested state information, select at least one electronic device based on the state information, and generate a charger list containing the selected at least one electronic device. As a result, the selected at least one electronic device may be an electronic device for which supplying power to another electronic device is permitted, an electronic device having a type and a state of a power source for stably supplying power, and/or an electronic device nearby the terminal 11.

Figure 3:
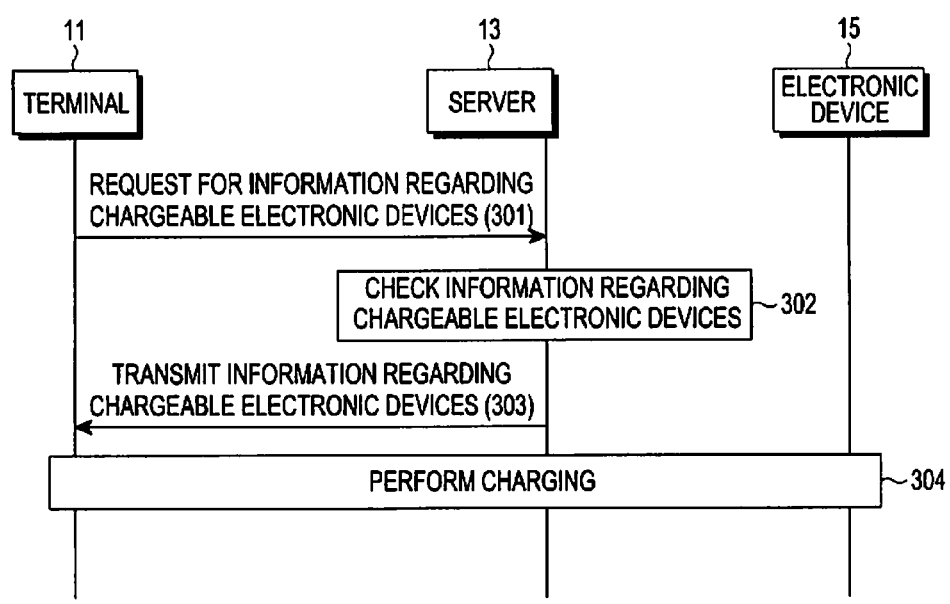
FIG. 3 is a signaling diagram illustrating a method of performing wireless charging between a terminal, a server, and an electronic device, according to a first embodiment of the present invention.

FIG. 3 is a signaling diagram illustrating a method of performing wireless charging between the terminal 11, the server 13, and the electronic device 15, according to a first embodiment of the present invention.

Referring to FIG. 3, when charging is required, the terminal 11 sends, to the server 13, a request for information regarding chargeable electronic devices in step 301. In step 302, the server 13 checks the information regarding chargeable electronic devices.

In detail, in step 302, the server 13 may search for electronic devices existing in an area where the terminal 11 is located, generate a charger list containing the found electronic devices including electronic device 15, and generate information regarding chargeable electronic devices, which contains the charger list.

Further, the server 13 may select at least one of the found electronic devices (e.g., electronic device 15) and generate a charger list containing the selected at least one electronic device. In order to more easily perform the selection of at least one electronic device, the server 13 may request the found electronic devices for state information to receive the state information, select at least one electronic device based on the state information, and generate a charger list containing the selected at least one electronic device. The state information may contain any one or a combination of two or more of information indicating whether the terminal 11 has permission to receive power supplied by the electronic device, information indicating a type and a state of a power source of the electronic device, and position information of the electronic device. As a result, the selected at least one electronic device may be an electronic device for which supplying power to another electronic device is permitted, an electronic device having a type and a state of a power source for stably supplying power, and/or an electronic device nearby the terminal 11.

Further, the server 13 may select at least one chargeable electronic device having an optimal charging condition and generate a charger list containing the selected at least one chargeable electronic device.

When the server 13 searches for electronic devices existing in the area where the terminal 11 is located, the server 13 may acquire a list of the electronic devices existing in the area where the terminal 11 is located by searching for information regarding electronic devices, which is stored in the DB 233. Alternatively, the server 13 may transmit (e.g., broadcast) a signal for wireless charging to at least one electronic device existing in the area where the terminal 11 is located and search for electronic devices responding to the signal.

In step 303, the server 13 transmits the information regarding chargeable electronic devices to the terminal 11.

In step 304, the terminal 11 confirms the information regarding chargeable electronic devices and performs charging with at least one chargeable electronic device 15 contained in the information regarding chargeable electronic devices.

Further, while the information regarding chargeable electronic devices contains the charger list as described above, the charger list may contain the found electronic devices or the selected at least one electronic device 15.

When the charger list contains the found electronic devices, the terminal 11 may further include a process of selecting at least one of the found electronic devices. For example, the terminal 11 may provide a list of the found electronic devices to the user through a display so as for the user to select at least one of the found electronic devices. Alternatively, the terminal 11 may automatically select an electronic device 15 satisfying a condition pre-set by the user from among the found electronic devices.

Further, the terminal 11 may select an electronic device 15 by using state information. The state information may be contained in the information regarding chargeable electronic devices, which has been received from the server 13, or acquired through communication with the found electronic devices. For example, to acquire the state information, the terminal 11 may send a request to the found electronic devices, which are contained in the charger list, for the state information and receive the state information from the found electronic devices.

When the charger list contains the selected at least one electronic device 15, since the server 13 performs a process of selecting at least one electronic device 15 or confirming the state information, it is not required for the terminal 11 to perform the process of selecting at least one electronic device 15 or confirming the state information. Thus, in this case, the terminal 11 directly performs charging with the selected at least one electronic device 15 without performing the process of selecting the at least one electronic device 15 or confirming the state information.

To perform charging in step 304, the terminal 11 sends, to the selected at least one electronic device 15, a request for power for wireless charging, and receives the power from the selected at least one electronic device 15. Further, in this process, the terminal 11 and the electronic device 15 may determine one of the electromagnetic induction method, the resonance method, and the RF/microwave radiation method, as well as determine a frequency to be used for wireless charging.

Figure 4:
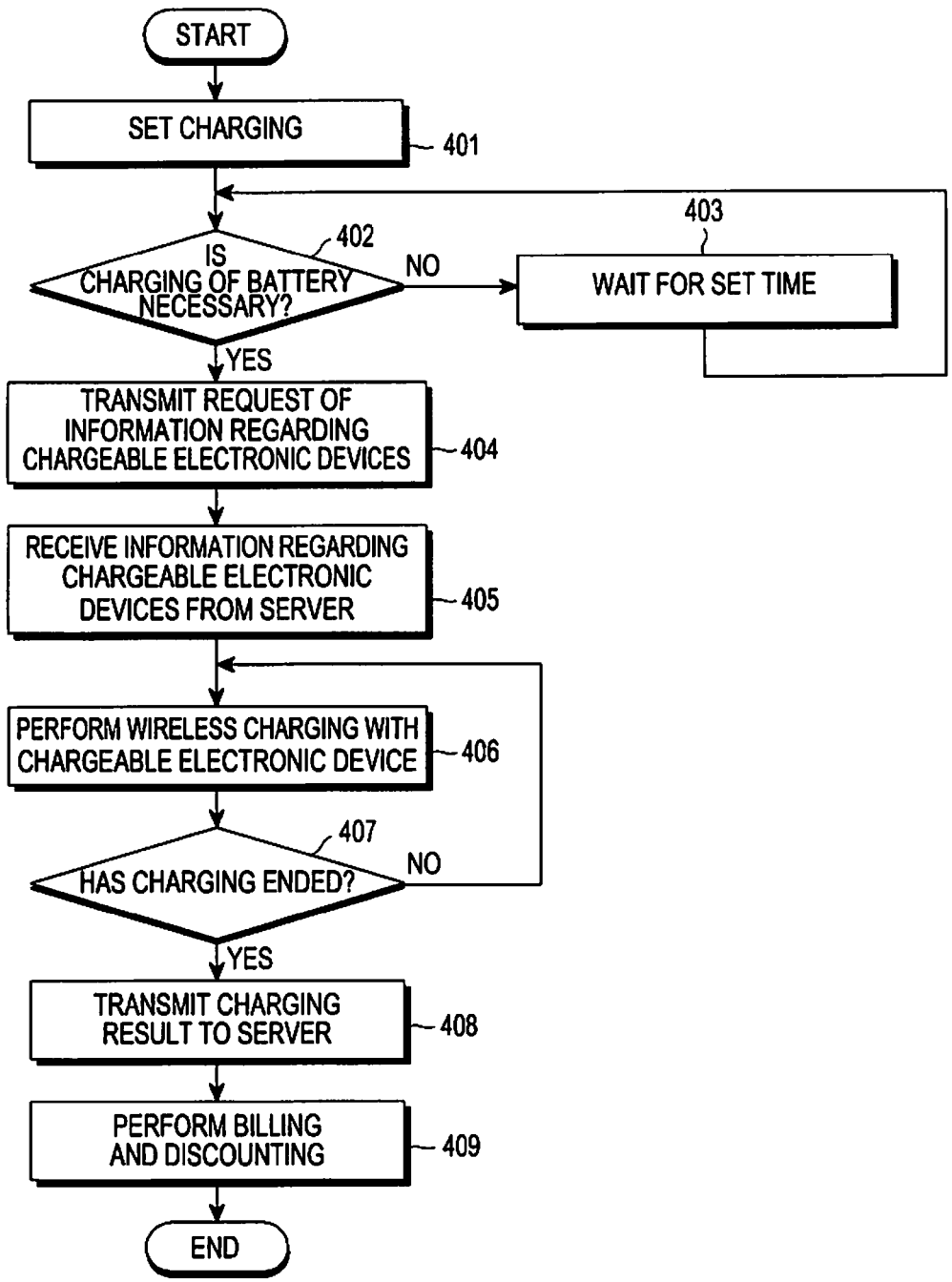
FIG. 4 is a flowchart illustrating a method of performing wireless charging in the terminal, according to the first embodiment of the present invention.

FIG. 4 is a flowchart illustrating a method of performing wireless charging in a terminal, according to the first embodiment of the present invention, which includes detailed procedures performed by the terminal 11 of FIG. 3.

Referring to FIG. 4, in step 401, the terminal sets a voltage level for automatically determining whether to charge a battery. For example, the terminal provides a menu for setting an automatic charging voltage level. When a user selects the automatic charging voltage level menu from among menus provided by the terminal, the terminal provides an interface for receiving, from the user, a reference voltage to be used for automatically determining whether to charge the battery. Accordingly, the terminal sets the reference voltage to be used for automatic charging.

In step 402, the terminal determines whether a voltage of the battery is relatively less than the reference voltage. If the voltage of the battery is relatively less than the reference voltage, the terminal determines that charging of the battery is necessary and proceeds to step 404. Otherwise, the terminal determines that charging of the battery is unnecessary and proceeds to step 403. In step 403, the terminal waits for a predetermined time and returns to step 402.

In step 404, the terminal sends, to a server, a request for information regarding chargeable electronic devices. For example, the terminal transmits, to the server, a message for requesting a supply of power. Here, the terminal may check position information indicating a current position of the terminal by activating a position information confirming module, such as a Global Positioning System (GPS) module, insert the checked position information into the request message r, and transmit the request message to the server. Further, the terminal may check an amount of power required to charge the terminal, further insert the confirmed power amount into the request message to be transmitted.

In step 405, the terminal receives the information regarding chargeable electronic devices from the server.

In step 406, the terminal confirms the information regarding chargeable electronic devices and performs charging at least one of the chargeable electronic devices.

As described above, the information regarding chargeable electronic devices may contain a charger list containing electronic devices found through a search process or selected electronic devices.

When the charger list contains found electronic devices, the terminal selects at least one of the found electronic devices. For example, the terminal provides, through a display, an interface for the user to select at least one of the found electronic devices to the user, and receives a list including at least one electronic device selected by the user. Alternatively, the terminal may provide, through a display, an interface that allows the user to input a criterion for selecting an electronic device, so that the user can select at least one of the found electronic devices, receive the criterion, and select an electronic device satisfying the received criterion from among the found electronic devices.

In order to more easily perform the electronic device selection, the terminal may request and receive state information from the found electronic devices and provide the state information to the user together with a list of the found electronic devices. The selection criterion may be set based on the state information.

The state information may contain at least one of information indicating whether there is permission to receive power supplied by a corresponding electronic device, information indicating a type and a state of a power source of the electronic device, and position information of the electronic device.

Further, to perform charging in step 406, the terminal sends a request to at least one selected electronic device for wireless charging power, and receives the power from the at least one selected electronic device. In this process, the terminal and the at least one selected electronic device may determine a method for performing wireless charging (e.g., any one of the electromagnetic induction method, the resonance method, and the RF/microwave radiation method) and determine a frequency to be used for wireless charging.

Meanwhile, a charging session for wireless charging may end, for example, when the battery of the terminal becomes fully charged. Accordingly, the terminal determines in step 407 whether the charging session with the electronic device has ended. If the charging session has ended, the terminal proceeds to step 408. Otherwise, the terminal returns to step 406 to continue the charging session with the electronic device.

In step 408, the terminal checks a charging result and transmits the charging result to the server. More specifically, the terminal checks a charged power amount used to charge the battery and transmits the charged power amount to the server.

In step 409, the terminal may receive, from the server, information indicating an amount of power used to charge the battery and also receive billing information for the wireless charging and provide the received information to the user.

Figure 5:
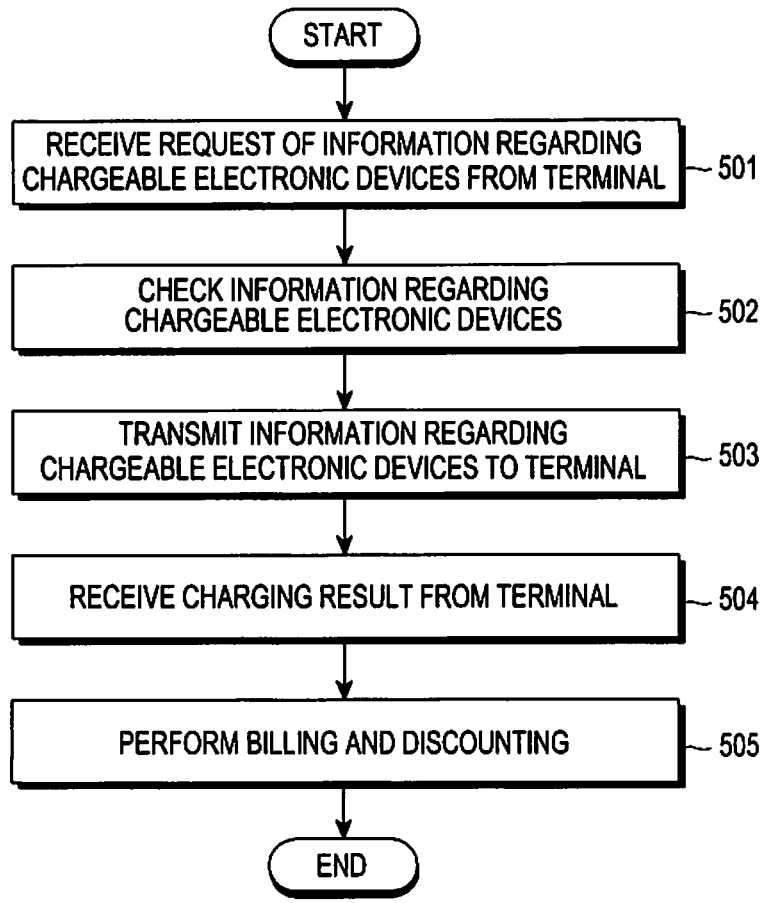
FIG. 5 is a flowchart illustrating a method of performing wireless charging in the server, according to the first embodiment of the present invention.

FIG. 5 is a flowchart illustrating a method for performing wireless charging in a server, according to the first embodiment of the present invention, which includes detailed procedures performed by the server 13 of FIG. 3.

Referring to FIG. 5, in step 501, the server receives, from a terminal, a request for information regarding chargeable electronic devices.

In step 502, the server checks the information regarding chargeable electronic devices.

In checking the information regarding chargeable electronic devices, the server searches for chargeable electronic devices and generates a charger list containing the found electronic devices. The server may further generate information regarding chargeable electronic devices that contains the charger list. The found electronic devices may be extracted by checking a DB of the server and searching for electronic devices existing in an area where the terminal is located. Alternatively, the server may transmit (e.g., broadcast) a signal for wireless charging to the electronic devices existing in the area where the terminal is located and search for electronic devices that respond to the signal.

The server may select at least one of the found electronic devices and generate information regarding chargeable electronic devices that contains the selected electronic device.

The at least one electronic device may be selected by confirming state information of the at least one electronic device. The state information may be stored in advance in the server or received in response to request for state information sent to the at least one electronic device. The selected at least one electronic device may be an electronic device for which supplying power to another electronic device is permitted, an electronic device having a type and a state of a power source for stably supplying power, and/or an electronic device near the terminal.

In step 503, the server transmits, to the terminal the information regarding chargeable electronic devices, which is generated as described above.

Thereafter, wireless charging between the terminal and the electronic device is performed. When the wireless charging ends, the server receives a charging result from the terminal in step 504. In step 505, the server checks an amount of power used to charge the terminal, transmits billing information according to charged power to the terminal, and provides, to the electronic device, a bill, such as a discount commission, for example, for the power used to charge the terminal.

Although, according to the description above, the charging result is received from the terminal, the present invention is not limited thereto. For example, according to an environment in which wireless charging is performed, power provided by the electronic device may not be identical to power used to charge the terminal. Thus, according to embodiments of the present invention, the server may receive both charging results from the terminal and the electronic device, and the server may process billing and discounting by considering both of the charging results received from the terminal and the electronic device.

Figure 6:
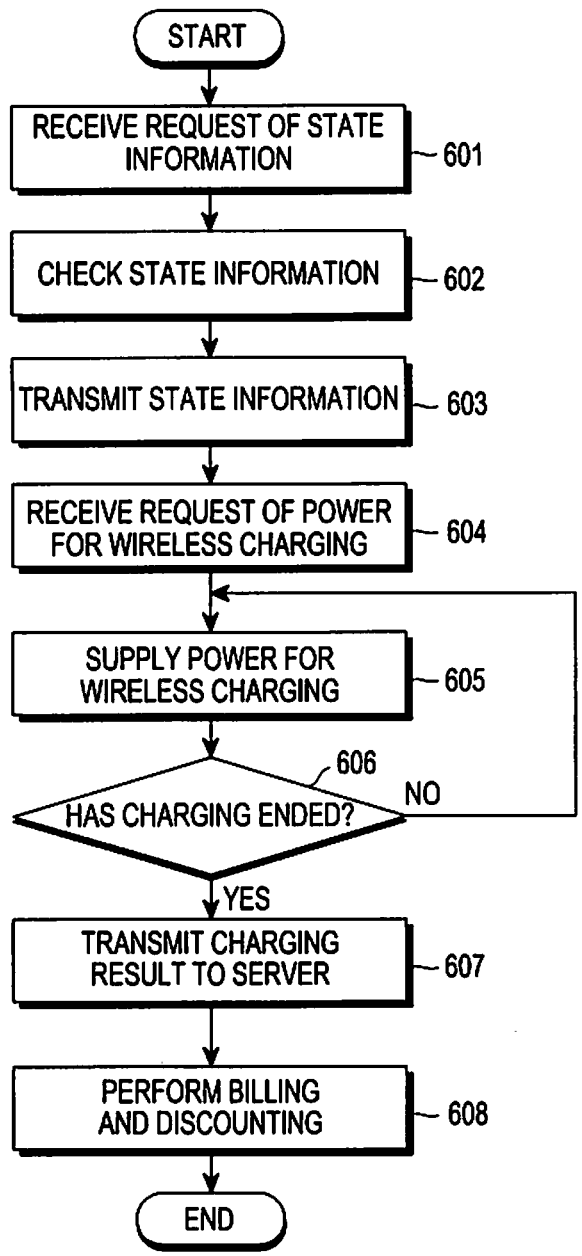
FIG. 6 is a flowchart illustrating a method of performing wireless charging in the electronic device, according to the first embodiment of the present invention.

FIG. 6 is a flowchart illustrating a method for performing wireless charging in an electronic device, according to the first embodiment of the present invention, which includes detailed procedures performed by the electronic device 15 of FIG. 3.

Referring to FIG. 6, in step 601, the electronic device receives, from a server or a terminal, a request for state information. In step 602, the electronic device checks state information thereof in response to the request. The state information may contain at least one of information indicating whether there is permission to supply power from the electronic device, information indicating a type and a state of a power source of the electronic device, and position information of the electronic device. In step 603, the electronic device transmits the confirmed state information to the server or the terminal.

In step 604, the electronic device receives, from the terminal, a request of power for wireless charging. In step 605, the electronic device transmits power for wireless charging. Further, in step 604, the electronic device may determine a method for performing wireless charging (e.g., any one of the electromagnetic induction method, the resonance method, and the RF/microwave radiation method) and determine a frequency to be used for wireless charging, through negotiation with the terminal.

Meanwhile, a charging session for wireless charging with the terminal may end, such as when a battery of the terminal is fully charged, for example. Accordingly, the electronic device determines, in step 606, whether the charging session with the terminal has ended. If the charging session has ended, the electronic device proceeds to step 607. Otherwise, the electronic device returns to step 605 to continue to provide charging power to the terminal.

In step 607, the electronic device checks a charging result and transmits the charging result to the server. More specifically, the electronic device checks an amount of power transmitted to charge the terminal and transmits the power amount to the server.

In step 608, to receive a discount commission corresponding to the power amount provided for wireless charging, the electronic device may receive discount information corresponding to the power amount used to charge the terminal from the server and provide the discount information to a user of the electronic device.

As described above, after the server searches for chargeable electronic devices, the server or the terminal may selectively select at least one of the found electronic devices. Accordingly, a method of performing wireless charging according to a second embodiment of the present invention illustrates a mechanism for selecting at least one electronic device in the terminal. A method of performing wireless charging according to a third embodiment of the present invention illustrates a mechanism for selecting at least one electronic device in the server. Although some aspects of the second and the third embodiments of the present invention are performed in the same way as in the first embodiment of the present invention, a process of the server or the terminal selecting at least one electronic device according to the second and third embodiments is different than the process according to the first embodiment. Thus, certain detailed operations in the second and the third embodiments of the present invention described below that are performed in the same way as the first embodiment of the present invention, are described with reference to the description of the first embodiment of the present invention described above.

Figure 7:
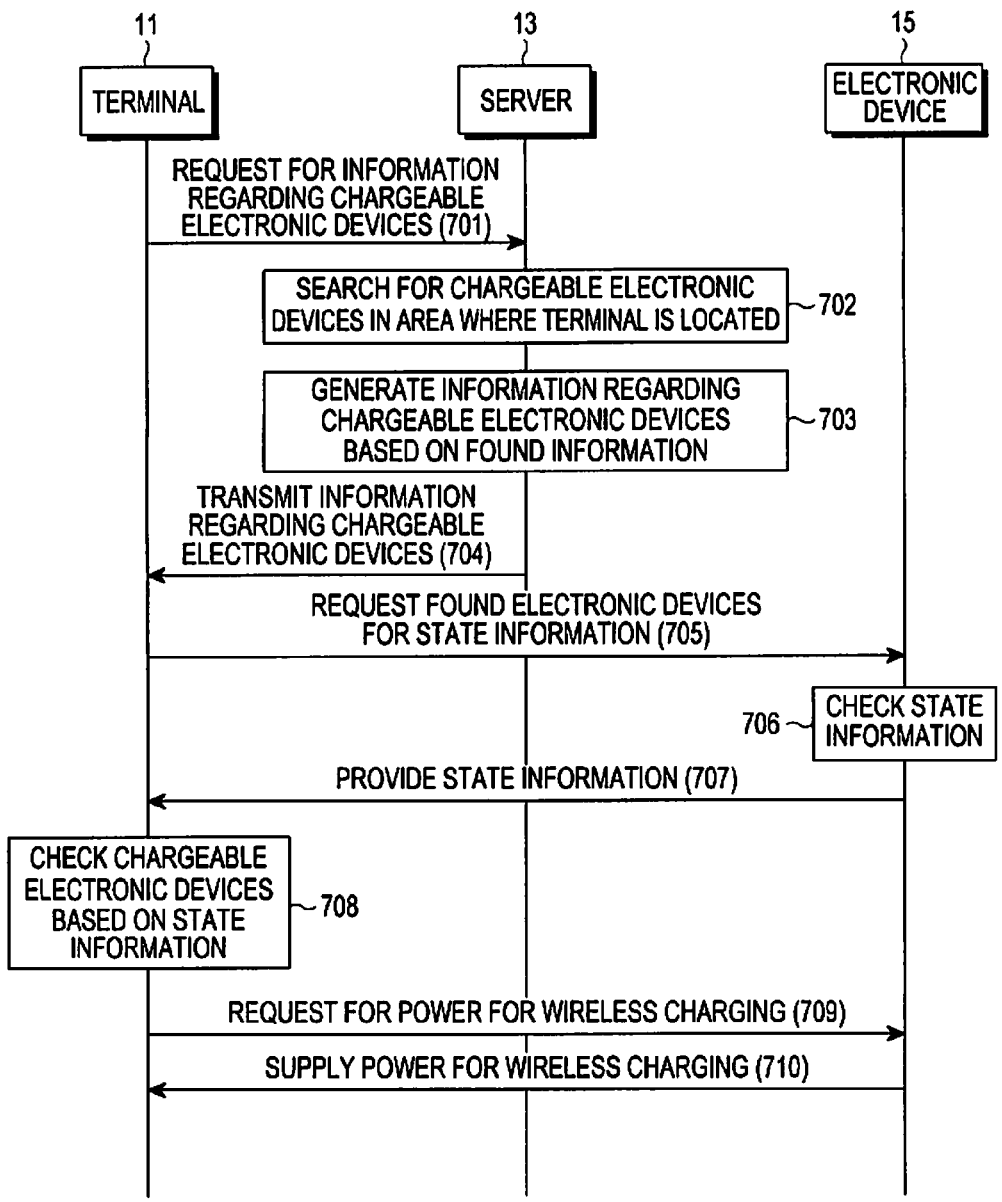
FIG. 7 is a signaling diagram illustrating a method of performing wireless charging between a terminal, a server, and an electronic device, according to a second embodiment of the present invention.

FIG. 7 is a signaling diagram illustrating a method for performing wireless charging between the terminal 11, the server 13, and the electronic device 15, according to the second embodiment of the present invention.

Referring to FIG. 7, when charging is required, the terminal 11 sends, to the server 13, a request for information regarding chargeable electronic devices 15, in step 701. In step 702, in response to the request, the server 13 searches for electronic devices 15 existing in an area where the terminal 11 is located. In step 703, the server 13 generates a charger list containing the found electronic devices 15 and generates information regarding chargeable electronic devices 15, which contains the charger list.

In step 704, the server 13 transmits the information regarding chargeable electronic devices 15 to the terminal 11.

Upon receiving the information regarding chargeable electronic devices 15, the terminal 11 confirms the found electronic devices 15 contained in the information regarding chargeable electronic devices 15 and sends, to the found electronic devices 15, requests for state information, in step 705.

Each of the found electronic devices 15 checks their own respective state information, in step 706, and transmits the confirmed state information to the terminal 11, in step 707.

In step 708, the terminal 11 selects a chargeable electronic device 15 based on the state information. For example, the terminal 11 provides a list of the found electronic devices 15 and state information thereof to a user and receives selection of at least one electronic device 15 from the user. Alternatively, the terminal 11 checks the state information and selects at least one electronic device 15 satisfying a criterion pre-set by the user.

In step 709, the terminal 11 sends, to the electronic device 15 selected in step 708, a request for power for wireless charging. In step 710, the electronic device 15 transmits the power for wireless charging to the terminal 11.

Figure 8:
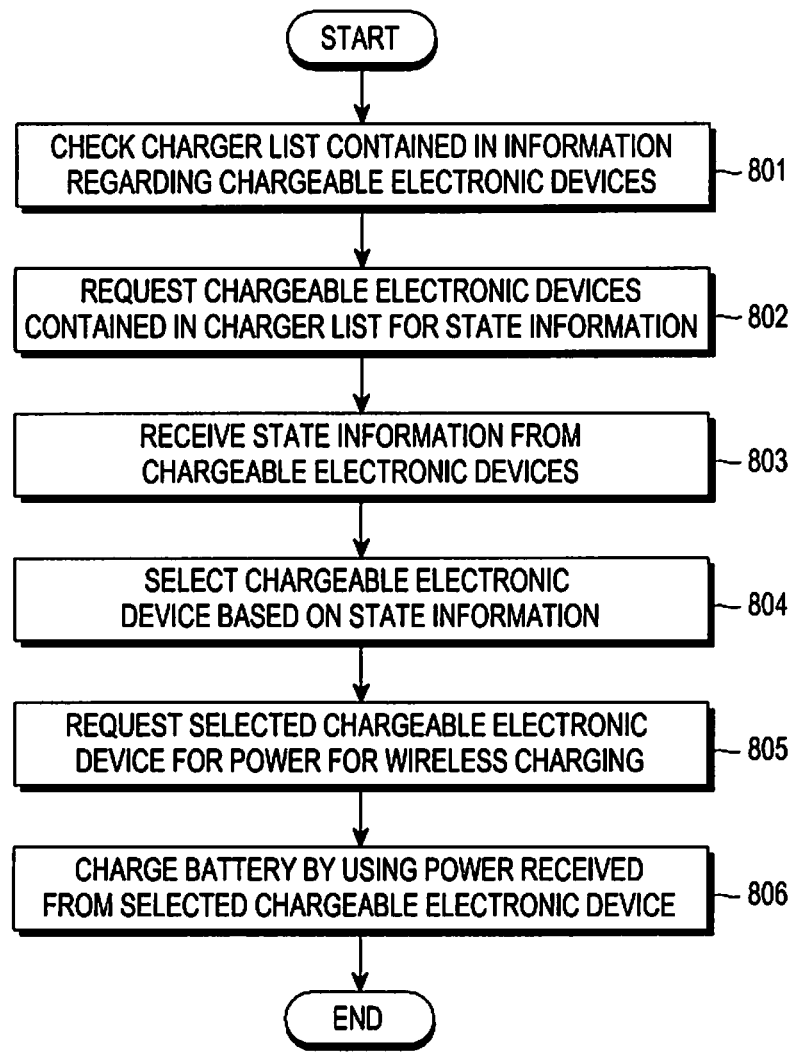
FIG. 8 is a flowchart illustrating a process of performing wireless charging with a chargeable electronic device in the method of performing wireless charging, according to the second embodiment of the present invention.

FIG. 8 is a flowchart illustrating a process for performing wireless charging with a chargeable electronic device in the method of performing wireless charging in a terminal, according to the second embodiment of the present invention, which includes detailed procedures performed by the terminal 11 of FIG. 7.

The method of performing wireless charging in a terminal according to the second embodiment of the present invention is performed in a manner similar to the method of performing wireless charging according to the first embodiment of the present invention. However, a process of performing wireless charging with a chargeable electronic device is different from the corresponding process according to the first embodiment of the present invention. Accordingly, all of the procedures of the method of performing wireless charging in a terminal according to the second embodiment of the present invention are referred to the description of FIG. 4 and the first embodiment of the present invention, and the process of performing wireless charging with a chargeable electronic device in the method of performing wireless charging in a terminal according to the second embodiment of the present invention are described in detail as follows.

Upon receiving information regarding chargeable electronic devices, the terminal checks a charger list contained in the information regarding chargeable electronic devices, in step 801. In step 802, the terminal confirms electronic devices contained in the charger list and requests the electronic devices for state information.

In response to the request, the terminal receives the state information from the electronic devices in step 803.

In step 804, the terminal selects a chargeable electronic device based on the state information. For example, the terminal provides a list of electronic devices found through a search process and state information of the found electronic devices to a user and receives selection of at least one electronic device from the user. Alternatively, the terminal checks the state information and selects at least one electronic device satisfying a criterion pre-set by the user.

In step 805, the terminal sends, to the selected electronic device, a request for power for wireless charging. In step 806, the terminal performs charging a battery of the terminal by using power wirelessly received from the selected electronic device.

Figure 9:
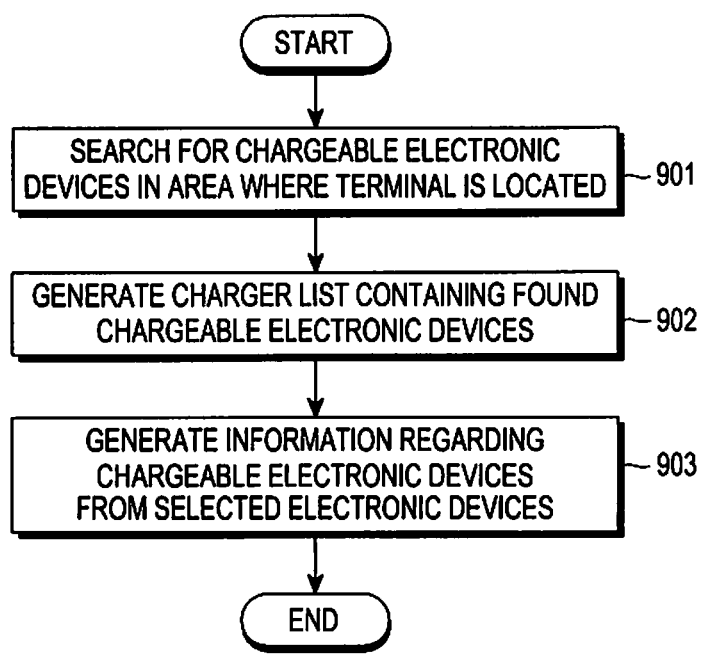
FIG. 9 is a flowchart illustrating a process of confirming information regarding chargeable electronic devices in a method of performing wireless charging in the server, according to the second embodiment of the present invention.

FIG. 9 is a flowchart illustrating a process for confirming information regarding chargeable electronic devices in a method of performing wireless charging in a server, according to the second embodiment of the present invention, which includes detailed procedures performed by the server 13 of FIG. 7.

The method of performing wireless charging in a server according to the second embodiment of the present invention is performed in a manner similar to the method of performing wireless charging according to the first embodiment of the present invention. However, a process of confirming information regarding chargeable electronic devices is different from the corresponding process according to the first embodiment of the present invention. Accordingly, all of the procedures of the method of performing wireless charging in a server according to the second embodiment of the present invention are referred to the description of FIG. 5 and the first embodiment of the present invention, and the process of confirming information regarding chargeable electronic devices in the method of performing wireless charging in a server according to the second embodiment of the present invention is described in detail as follows.

To confirm the information regarding chargeable electronic devices, the server searches for chargeable electronic devices in step 901. For example, the server may extract found electronic devices by checking a DB of the server and searching for electronic devices existing in an area where the terminal is located. Alternatively, the server may transmit (e.g., broadcast) a signal for wireless charging to the electronic devices existing in the area where the terminal is located and search for electronic devices responding to the signal.

The server generates a charger list containing the found electronic devices in step 902 and generates the information regarding chargeable electronic devices, which contains the charger list, in step 903.

Figure 10:
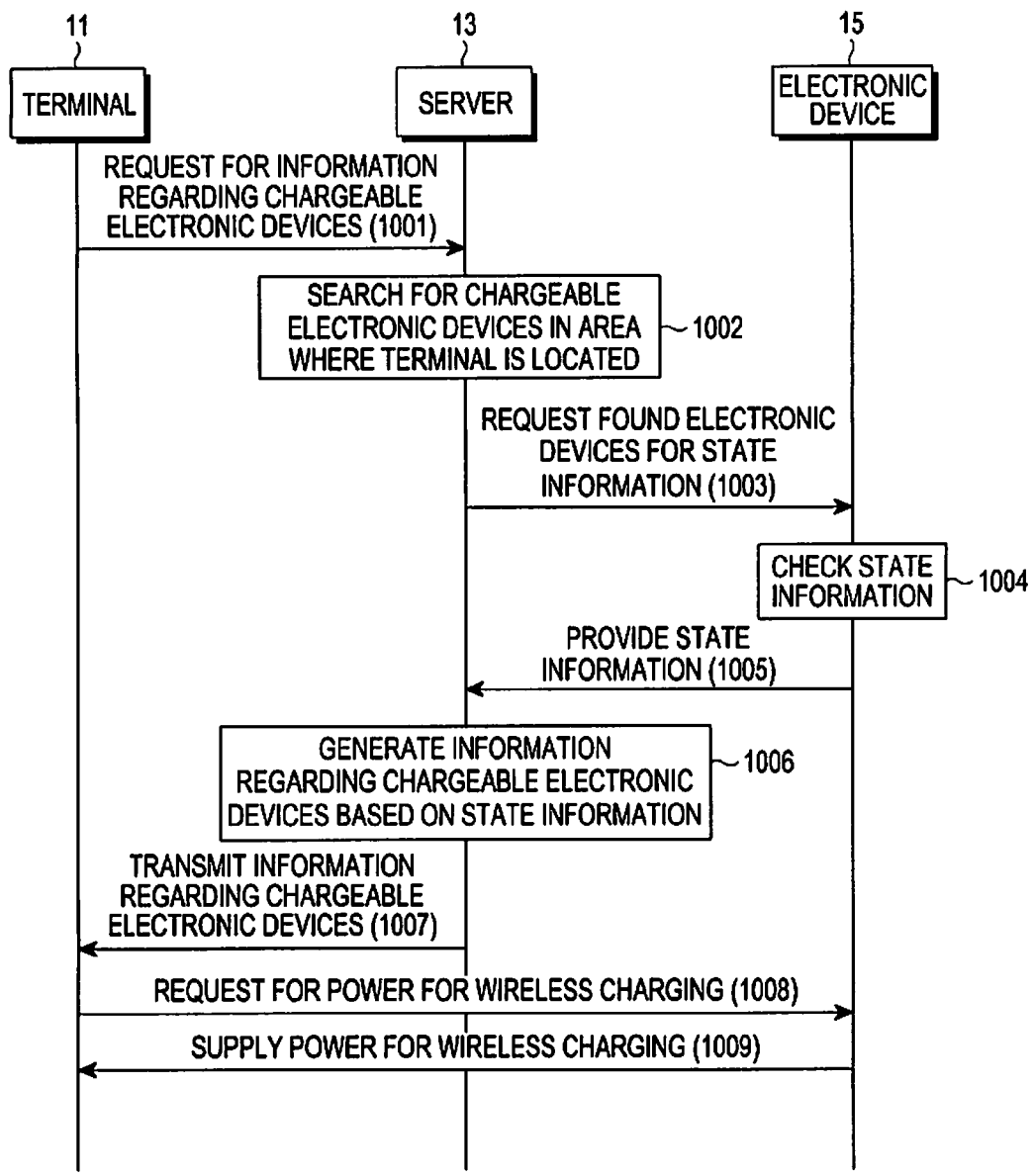
FIG. 10 is a signaling diagram illustrating a method of performing wireless charging between a terminal, a server, and an electronic device, according to a third embodiment of the present invention.

FIG. 10 is a signaling diagram illustrating a method for performing wireless charging between the terminal 11, the server 13, and the electronic device 15, according to the third embodiment of the present invention.

Referring to FIG. 10, when charging is required, the terminal 11 requests the server 13 for information regarding chargeable electronic devices 15, in step 1001. In step 1002, in response to the request, the server 13 searches for electronic devices 15 existing in an area where the terminal 11 is located.

In step 1003, the server 13 sends, to the found electronic devices 15, requests for state information.

In response to the request, each of the found electronic devices 15 checks its own respective state information, in step 1004, and transmits the state information to the server 13 in step 1005.

In step 1006, the server 13 selects at least one electronic device 15 based on the state information, generates a charger list containing the selected at least one electronic device 15, and generates information regarding chargeable electronic devices 15, which contains the charger list. For example, the selected at least one electronic device 15 may be an electronic device for which supplying power to another electronic device is permitted, an electronic device having a type and a state of a power source for stably supplying power, and/or an electronic device nearby the terminal 11.

Further, in step 1006, the server 13 may select at least one chargeable electronic device 15 having an optimal charging condition and generate a charger list containing the selected at least one chargeable electronic device 15 having the optimal charging condition.

In step 1007, the server 13 transmits the information regarding chargeable electronic devices 15 to the terminal 11.

In step 1008, the terminal 11 confirms an electronic device 15 contained in the charger list by checking the information regarding chargeable electronic devices 15 and sends, to the electronic device 15, a request for power for wireless charging. In step 1009, the electronic device 15 transmits the power for wireless charging to the terminal 11. In this process, the terminal 11 and the electronic device 15 may determine a method for performing wireless charging, (e.g., any one of the electromagnetic induction method, the resonance method, and the RF/microwave radiation method) and determine a frequency to be used for wireless charging.

Figure 11:
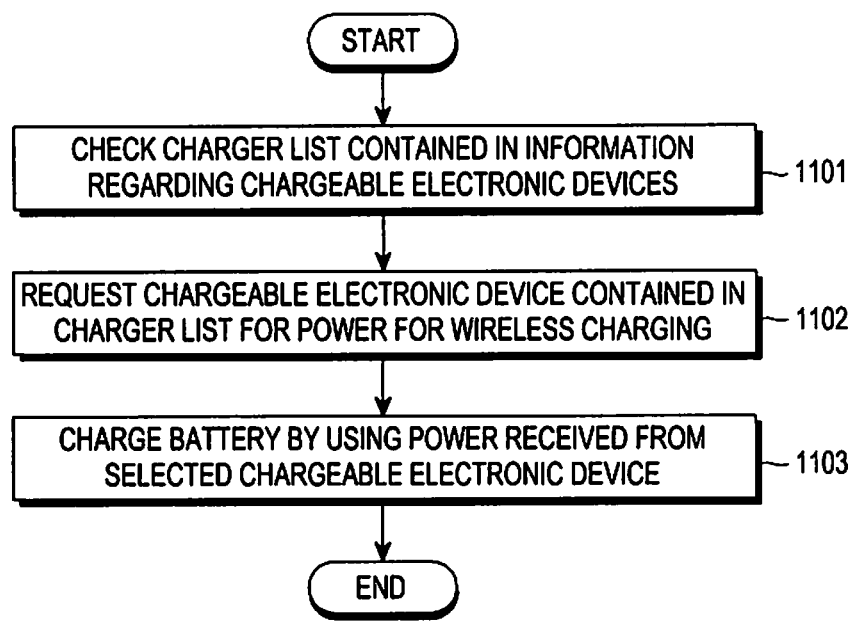
FIG. 11 is a flowchart illustrating a process of performing wireless charging with a chargeable electronic device in the method of performing wireless charging, according to the third embodiment of the present invention.

FIG. 11 is a flowchart illustrating a process for performing wireless charging with a chargeable electronic device in the method of performing wireless charging, according to the third embodiment of the present invention, which includes detailed procedures performed by the terminal 11 of FIG. 10.

The method of performing wireless charging in a terminal according to the third embodiment of the present invention is performed in a manner similar to the method of performing wireless charging according to the first embodiment of the present invention. However, a process of performing wireless charging with a chargeable electronic device is different from the first embodiment of the present invention. Accordingly, all of the procedures of the method of performing wireless charging in a terminal according to the third embodiment of the present invention refer to the description of FIG. 4 and the first embodiment of the present invention, and the process of performing wireless charging with a chargeable electronic device in the method of performing wireless charging in a terminal according to the third embodiment of the present invention are described in detail as follows.

Upon receiving information regarding chargeable electronic devices, the terminal checks a charger list contained in the information regarding chargeable electronic devices, in step 1101. In step 1102, the terminal confirms a selected electronic device contained in the charger list and sends, to the selected electronic device, a request for power for wireless charging. In step 1103, the terminal charges a battery of the terminal by using power received in a wireless manner from the selected electronic device.

Figure 12:
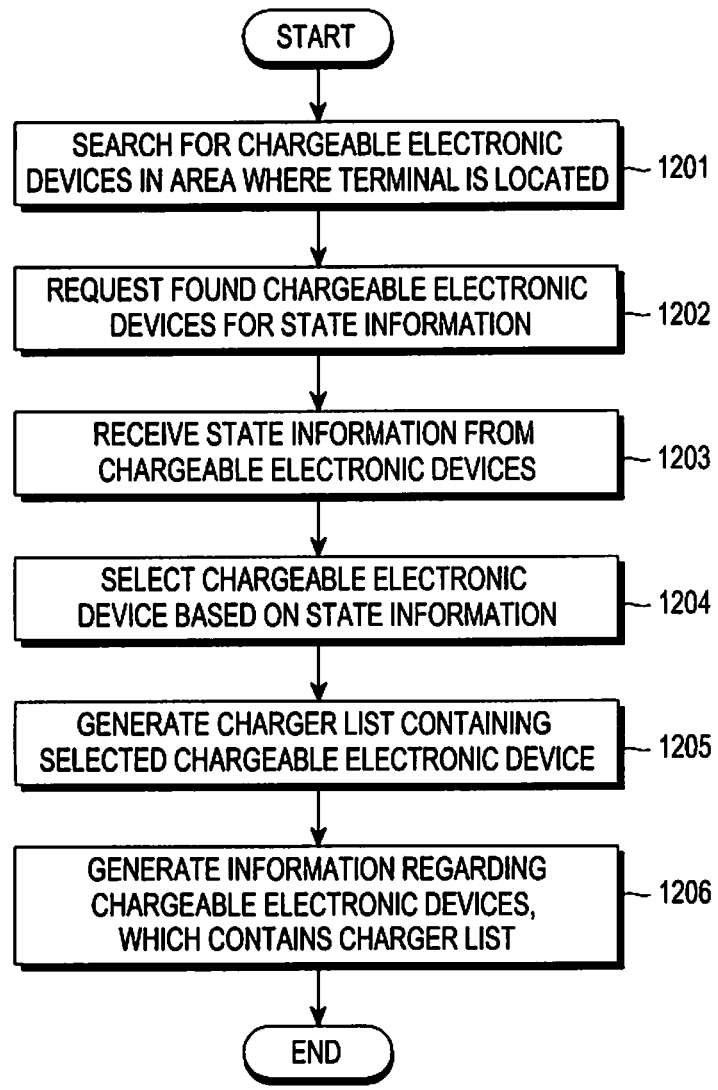
FIG. 12 is a flowchart illustrating a process of confirming information regarding chargeable electronic devices in a method of performing wireless charging in the server, according to the third embodiment of the present invention.

FIG. 12 is a flowchart illustrating a process for confirming information regarding chargeable electronic devices in a method of performing wireless charging in a server, according to the third embodiment of the present invention, which includes detailed procedures performed by the server 13 of FIG. 10.

The method of performing wireless charging in a server according to the third embodiment of the present invention is performed in a manner similar to the method of performing wireless charging according to the first embodiment of the present invention. However, a process of confirming information regarding chargeable electronic devices is different from the first embodiment of the present invention. Accordingly, all of the procedures of the method of performing wireless charging in a server according to the third embodiment of the present invention refer to the description of FIG. 5 and the first embodiment of the present invention, and the process of confirming information regarding chargeable electronic devices in the method of performing wireless charging in a server according to the second embodiment of the present invention is described in detail as follows.

In order to confirm the information regarding chargeable electronic devices, the server searches for chargeable electronic devices, in step 1201. For example, the server may extract found electronic devices by checking a DB of the server and searching for electronic devices existing in an area where the terminal is located. Alternatively, the server may transmit (e.g., broadcast) a signal for wireless charging to the electronic devices existing in the area where the terminal is located and search for electronic devices that respond to the signal.

In step 1202, the server sends, to the found electronic devices, a request for state information. In response to the request, the server receives the state information from the electronic devices, in step 1203.

In step 1204, the server selects at least one electronic device based on the state information. For example, the server may select an electronic device of which the state information indicates permission to supply power, an electronic device having a type and a state of a power source for stably supplying power, and/or an electronic device near the terminal.

Further, in step 1204, the server may select at least one chargeable electronic device having an optimal charging condition and generate a charger list containing the selected at least one chargeable electronic device having the optimal charging condition.

The server generates a charger list containing the selected electronic device in step 1205 and generates the information regarding chargeable electronic devices, which contains the charger list, in step 1206.

According to embodiments of the present invention, charging can be easily performed using an electronic device for wireless charging or a portable terminal of another person without any limitation of a place or time.

In addition, since wireless charging between portable terminals can be implemented, charging can be easily performed using another person's portable terminal.

While the invention is shown and described with reference to certain embodiments thereof, it will be understood by those skilled in the art that various changes in form and details may be made therein without departing from the spirit and scope of the invention as defined by the appended claims.

What is claimed is:

1. A method for wirelessly charging an electronic apparatus, the method comprising:
   sending, to a server, a request for information regarding chargeable electronic devices; receiving, from the server, the information including a chargeable electronic device list including at least one of the chargeable electronic devices existing in an area where the electronic apparatus is located;
   choosing a first electronic device among the at least one of the chargeable electronic devices; and
   charging the electronic apparatus with power supplied by the first electronic device; wherein charging the electronic apparatus further comprises: checking state information of the at least one of the chargeable electronic devices included in the chargeable electronic device list; and choosing the first electronic device based on the state information of the electronic devices.

2. The method of claim 1, wherein sending the request for information regarding chargeable electronic devices comprises:
   determining position information of the electronic apparatus; and
   transmitting a charging information request message containing the determined position information to the server.

3. The method of claim 1, wherein charging the electronic apparatus comprises:
   sending, to the at least one of the chargeable electronic devices included in the chargeable electronic device list, a request for power for wireless charging; and
   receiving the requested power for wireless charging from the at least one of the chargeable electronic devices included in the chargeable electronic device list.

4. The method of claim 3, wherein charging the electronic apparatus further comprises transmitting, to the server, a result of the wireless charging.

5. The method of claim 1, wherein the state information includes information indicating whether there is permission for each corresponding electronic device to supply power to the electronic apparatus.

6. The method of claim 1, wherein the state information includes information indicating a type and a state of a power source of each of the at least one electronic device.

7. The method of claim 6, wherein the state information includes position information of each of the at least one electronic device.

8. The method of claim 3, wherein sending the request for power for wireless charging includes sending a request to each of the at least one of the chargeable electronic devices included in the chargeable electronic device list.

9. A method for managing wireless charging of an electronic apparatus performed in a server, the method comprising:
   receiving, from a terminal, a request of information regarding chargeable electronic devices;
   checking the information regarding chargeable electronic devices; and
   transmitting, to the electronic apparatus, the checked information including a chargeable electronic device list including at least one of the chargeable electronic devices existing in an area where the electronic apparatus is located,
   wherein checking the information regarding the chargeable electronic devices comprises:
   determining state information of the found electronic devices; and
   determining at least one chargeable electronic device to be included in the information transmitted to the electronic apparatus based on the state information of the found electronic devices.

10. The method of claim 9, wherein checking the information regarding the chargeable electronic devices comprises:
    generating the chargeable electronic device list including the found electronic devices;
    generating the information regarding chargeable electronic devices, which includes the chargeable electronic device list; and
    transmitting the generated information regarding the chargeable electronic devices to the electronic apparatus.

11. The method of claim 9, wherein checking the information regarding chargeable electronic devices comprises searching for electronic devices that exist within a predetermined range from the electronic apparatus and can supply power to the electronic apparatus.

12. The method of claim 9, wherein determining the state information of the found electronic devices comprises:
    sending, to the found electronic devices, a request for the state information; and
    receiving the state information from the found electronic devices.

13. The method of claim 9, wherein the state information includes information indicating whether there is permission for each corresponding electronic device to supply power to the electronic apparatus.

14. The method of claim 9, wherein the state information includes information indicating a type and a state of a power source of each one of the found electronic devices.

15. The method of claim 14, wherein the state information includes position information of each one of the found electronic devices.

16. A method performed in an electronic device for managing a
    supply of power for wireless charging of a terminal through a server, the method comprising: receiving, from the server, a request for state information of the electronic device; determining the state information; transmitting the determined state information to the server; receiving, from the terminal, a request for supplying power for wireless charging of the terminal based on information regarding chargeable electronic devices including a chargeable electronic device list including at least one of the chargeable electronic devices existing in an area where the terminal is located; and supplying power for wireless charging of the terminal according to the received request.

17. The method of claim 16, wherein the state information includes information indicating whether there is permission for the electronic device to supply power to the terminal.

18. The method of claim 16, wherein the state information includes information indicating a type and a state of a power source of the electronic device.

19. The method of claim 16, wherein the state information includes position information of the electronic device.

20. A portable terminal comprising: a wireless charging processor for receiving information including a chargeable electronic device list including at least one of the chargeable electronic devices existing in an area where the portable terminal is located through communication with a server, choosing a first electronic devices among the at least one of the chargeable electronic devices, and controlling wireless charging with power supplied by the first electronic device; and
 a receiver for receiving wireless power supplied from the first electronic device and providing the received power to a battery of the portable terminal;
 wherein controlling the wireless charging further comprises:
 checking state information of the at least one of the chargeable electronic devices included in the chargeable electronic device list; and
 choosing the first electronic device based on the state information of the electronic devices.

21. A server apparatus comprising:
 a processor for checking information including a chargeable electronic device list including at least one of the chargeable electronic devices existing in an area where a terminal is located, and determining the checked information to the terminal; and managing information regarding the terminal and at least one electronic device for wirelessly supplying power to the terminal;
wherein checking the information comprises:
 determining state information of found electronic devices; and
 determining the at least one chargeable electronic device to be included in the information transmitted to the terminal based on the state information of the found electronic devices, and
 wherein a request of the information including the chargeable electronic device list is received from the terminal.

22. An electronic device for supplying a power for wireless charging comprising:
 a processor for determining state information of the electronic device, controlling communication with a terminal and a server, and controlling a supply of power requested by the terminal; and
 a power converter for converting power supplied by a power source unit into wireless power to be wirelessly supplied to the terminal;
 wherein controlling the communication with the terminal and the server comprises:
 receiving, from the server, a request for the state information of the electronic device;
 transmitting the state information of the electronic device to the server;
 receiving, from the terminal, a request for supplying power for wireless charging of the terminal based on information regarding chargeable electronic devices including a chargeable electronic device list including at least one of the chargeable electronic devices existing in an area where the terminal is located.

23. The method of claim 17, wherein supplying the power for wireless charging of the terminal comprises exchanging information regarding a charging method and a charging frequency with the terminal and supplying the power for wireless charging based on the exchanged information.

\* \* \* \* \*